Jan. 5, 1971  W. V. GREGORY, JR  3,552,218
TUBULA FLEXIBLE REMOTE MULTIPLE CONTROL
Filed Jan. 28, 1969
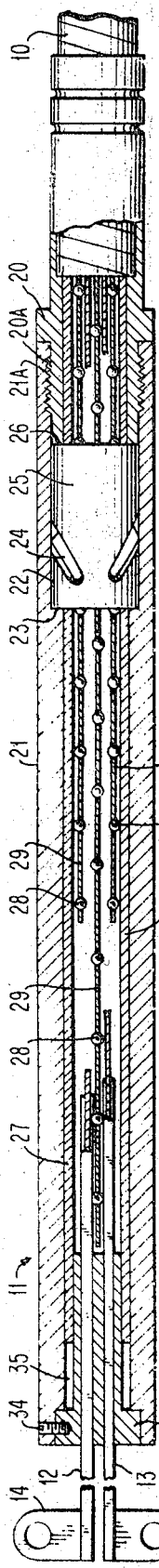
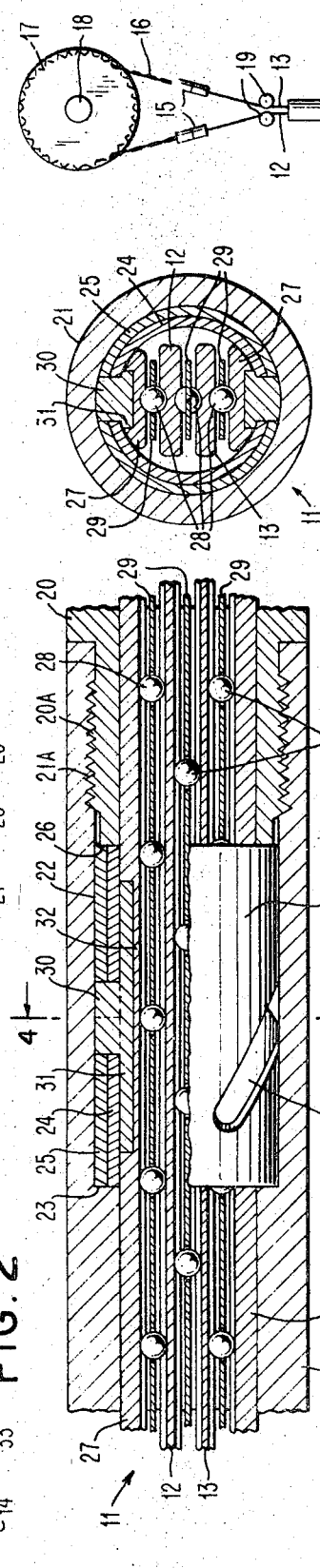
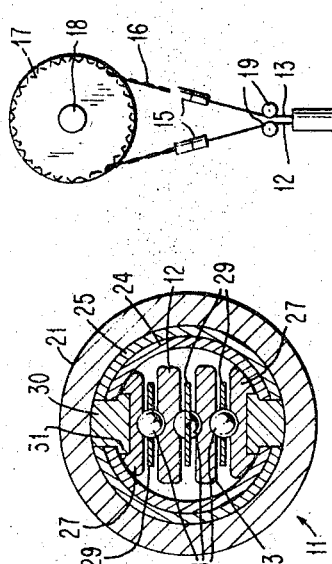
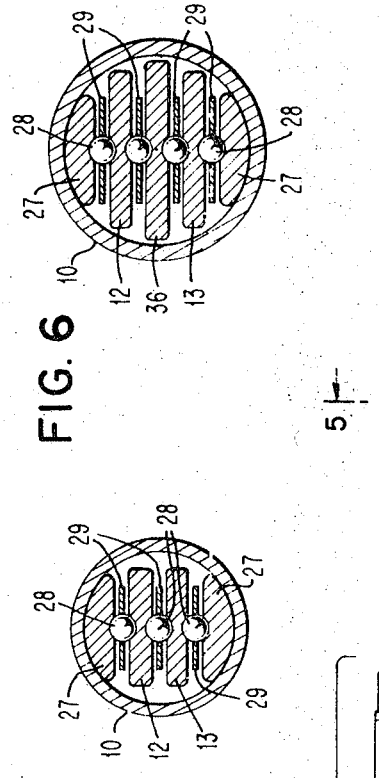
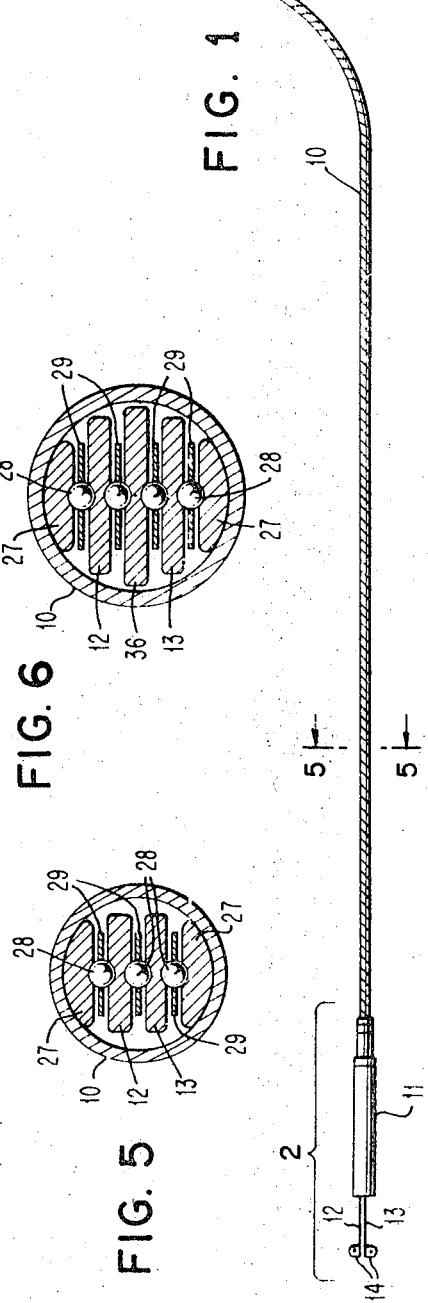
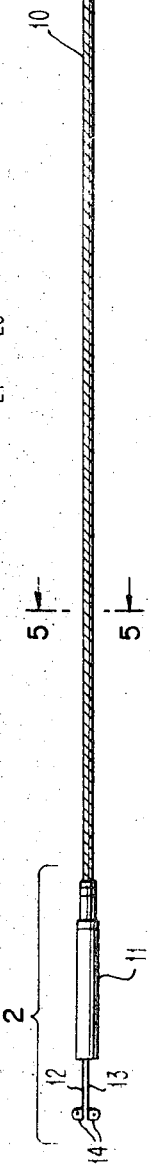
INVENTOR.
WALTER V. GREGORY, JR.
BY *Paul W. Farleo*
AGENT

United States Patent Office 3,552,218
Patented Jan. 5, 1971

3,552,218
TUBULAR FLEXIBLE REMOTE MULTIPLE CONTROL
Walter V. Gregory, Jr., Candelwood Isle, Conn., assignor to Controlex Corporation of America, Croton Falls, N.Y., a corporation of New York
Filed Jan. 28, 1969, Ser. No. 794,617
Int. Cl. F16c 1/20
U.S. Cl. 74—501                                   9 Claims

ABSTRACT OF THE DISCLOSURE

The novel tubular flexible remote control has two or more push-pull members, each of which is movable on rolling elements disposed on its opposite sides. Such control with two push-pull members may be coupled with a chain and sprocket mounted on a rotatable shaft so that by pulling one member or the other the shaft may be rotated in either direction and thus effect the remote operation of a valve, a boat rudder or the like.

BACKGROUND OF THE INVENTION

This invention relates to a tubular flexible remote control device in which two or more push-pull members are slidable lengthwise in the tubular sheath on rolling elements disposed on opposite sides of each member.

Illustrative of tubular flexible remote control devices is that disclosed in U.S. Pat. 3,287,990 to Ellinger. Such prior remote control devices of the push-pull type have heretofore been limited to a single force-transmitting member which generally can pull a heavier load than it can push. While the pulling capacity of the flexible force-transmitting member is limited by its tensile strength, the pushing capacity is restricted by the tendency of the flexible member to buckle at a heavy load and, consequently, to cause jamming and binding within the tubular sheath.

Furthermore, prior remote control devices have been subject in varying degree to backlash which is undesirable where the control device is intended to cause immediate and accurate adjustments in a remotely positioned operable unit.

Accordingly, the object of this invention is to provide an improved tubular flexible remote control device which has two or more force-transmitting elements and which is operable without the limitations heretofore encountered with prior control devices having a single force-transmitting element.

SUMMARY OF THE INVENTION

In accordance with this invention, the remote control device comprises a flexible tubular sheath, a pair of flexible guide members or races disposed in the sheath in contact with diametrically opposite portions of its inner surface, and at least two generally flat flexible force-transmitting members positioned between the races and maintained in spaced relation to the races as well as to each other by rows of rolling elements, preferably held separated from each other by elongate cages.

For a fuller understanding of the invention, illustrative embodiments will now be described in detail in connection with the accompanying drawings.

BRIEF DESCRIPTION OF THE DRAWINGS

FIG. 1 is an exterior view of a flexible remote control device which is an embodiment of the invention having two push-pull members.

FIG. 2 is a longitudinal section of the end of the control device of FIG. 1 embraced by bracket 2, showing in larger scale the interior construction of the end fitting;

FIG. 3 is an enlarged portion of FIG. 2 showing the slotted anchor tubes with about one-fourth thereof cut away longitudinally;

FIG. 4 is a section taken along line 4—4 of FIG. 3;

FIG. 5 is a section taken along line 5—5 of FIG. 1 but on the same scale of FIG. 4; and FIG. 6 is a section, similar to FIG. 5, of another embodiment of the invention having three push-pull members.

DESCRIPTION OF PREFERRED EMBODIMENT

The flexible remote control device shown in FIG. 1 comprises flexible sheath 10, which is usually a spirally constructed metal tube or conduit, and end fittings 11. Two force-transmitting members 12, 13 extend beyond end fittings 11. At the left end of FIG. 1, members 12, 13 terminate with connectors 14 attached to their ends. The opposite ends of members 12, 13 are attached to turnbuckles 15 which are also attached to the two ends of chain 16 looped around and engaging sprocket 17 mounted on rotatable shaft 18. In order to guide members 12, 13 straight in and out of end fitting 11 adjacent sprocket 17 when these members are moved, two rollers 19 are placed in contact with the outer faces of members 12, 13 and it is only beyond rollers 19 that members 12, 13 can curve away from each other to form the closed loop with chain 16 around sprocket 17.

As shown in FIG. 2, end fitting 11 has two tubular parts 20, 21 which are screwed together at their threaded portions 20A, 21A, respectively, Tubular part 20 is fastened to the end of sheath 10. Inner threaded end 21A of tubular part 21 is contiguous to smooth bore 22 which terminates at shoulder 23 within tubular part 21. Before tubular parts 20, 21 are screwed together, two concentric slotted tubes 24, 25, like those disclosed in U.S. Pat. 3,287,990, are placed in bore 22 of tubular part 21. After tubular parts 20, 21 are screwed together, end 26 of part 20 together with shoulder 23 of part 21 completes the chamber in fitting 11 in which concentric slotted tubes 24, 25 are retained. The total thickness of concentric slotted tubes 24, 25 is equal to the width of shoulder 23 so that the inside diameter of slotted tube 24 within slotted tube 25 is the same as the inside diameter of tubular part 21 to the left of shoulder 23.

Extending through sheath 10 and into both end fittings 11 are two guide members or ball races 27 in contact with diametrically opposite portions of the inner surface of sheath 10 and end fittings 11. Between races 27 extend the two flexible force-transmitting members 12, 13 separated from each other and from the two races 27 by three rows of spaced balls 28 which are kept apart from each other in each row by ball-cage strip 29.

As disclosed in U.S. Pat. 3,287,990, the two concentric slotted tubes 24, 25, retained within bore 22 of tubular part 21 by shoulder 23 and end 26 of tubular part 20, provide an anchoring device for the two ball races 27. As disclosed in applicant's copending application Ser. No. 674,779, filed Oct. 12, 1967, each race 27 has attached to it a stud 30 which is an integral part of an elongated base 31 that is set in a recess 32 in race 27 just large enough to hold base 31. Each stud 30 thus attached to a race 27 projects through a pair of crossed slots of concentric tubes 24, 25. The anchoring device for races 27 permits one race 27 to move relative to end fitting 11 a small distance in one direction while the other race 27 is permitted to move an equal distance in the opposite direction. This small movement of races 27 in opposite directions is made possible in the design of the flexible remote control to accommodate the difference in the radii of curvature of the two races 27 where the remote control is installed with any bend in it.

While each stud 30 may be circular in cross section, it is preferably diamond shaped (rhombic) in cross section as indicated in FIG. 3. In either case, stud 30 passes with a snug but slidable fit through the slot of tube 24 and the slot of tube 25 at the point where the two slots cross one another.

As shown in FIG. 2, the outer end of end fitting 11, out of which push-pull blades 12, 13 extend, is closed with plug 33 that is held in tubular part 21 by set screw 34. Plug 33 has two longitudinal slots therethrough having a cross section corresponding to that of push-pull blades 12, 13 which are slidable through these slots. Plug 33 is also formed to fit between the two ball races 27 and thus acts as a retainer to hold the free ends of races 27 against diametrically opposite portions of the inside surface of tubular part 21. The two channels 35 between tubular part 21 and plug 33 are long enough that, when the remote control is bent, the end of race 12 is free to move to the right without dropping out of channel 35 while the end of race 13 is free to move to the left without being stopped by the shoulder of plug 33 which receives set screw 34. For a different bend in the remote control, race 12 can move to the left without being stopped by the shoulder of plug 33 while race 13 can move to the right without dropping out of channel 35.

FIG. 2 shows the relative positions of all the elements of the remote control when it is held perfectly straight and a push-pull blades 12, 13 are both in their midstroke positions. In such case, FIG. 2 shows the relative positions of all the elements in both end fittings 11. Under these conditions, as shown in FIG. 2, while the center ball-cage strip 29 extends from plug 33 to the plug 33 at the opposite end of the remote control, the two ball-cage strips 29 adjacent races 27 are preferably shorter at both ends by one-fourth of the length of the full stroke of each of push-pull blades 12, 13. When a push-pull blade is moved in either direction, the ball-cage strip between that blade and the ball race will move in the same direction as the blade but its movement is half of that of the blade. Thus, if blade 12 in FIG. 2 is pushed in the remaining half stroke and simultaneously blade 13 is pulled out the remaining half stroke, then ball-cage strip 29 above blade 12 will have moved away from plug 33 sufficiently to just contact plug 33 at the opposite end of the remote control, while ball-cage strip 29 below blade 13 will have moved in the opposite direction sufficiently to just contact plug 33 of FIG. 2. To summarize, it is preferred to have the two outer ball-cage strips 29 move with their rolling balls 28 and, for this reason, the length of each of the two outer ball-cage strips 29 is shorter than the length of the middle ball-cage strip 29, which just contacts plugs 33 at the opposite ends of the remote control, by one-half of the length of the full stroke of blades 12, 13.

FIG. 6 shows an embodiment of the invention in which three force-transmitting members or push-pull blades are used. Like FIG. 5, FIG 6 is a section view of the flexible remote control through sheath 10 at any point along its length. The modified control of FIG. 6 has a third push-pull blade 36 between push-pull blades 12, 13. As in FIG. 5, a row of spaced balls 28, held separated from one another by elongated ball-cage strip 29, is disposed in contact with the ball groove on each race 27 and on each wide face of blades 12, 13, 36 in FIG. 6.

As a specific example of the flexible remote control of FIGS. 1 through 5, a spirally wrapped metal conduit with an inside diameter of ½ inch provides sheath 10 to enclose the two push-pull blades 12, 13, each $13/32$ inch wide and $11/128$ inch thick. Each race 27 has a maximum thickness of $15/128$ inch and a width of ⅜ inch. Balls 28 are $3/32$ inch in diameter and ball-cage strip 29 is $1/64$ inch thick. The full stroke of blade 12 or 13 is 6 inches and the two outer ball-cage strips 29 are each 3 inches shorter than the middle ball-cage strip 29 which extends from one plug 33 to the other plug 33 at the opposite ends of the remote control. This control, made 50 feet in length and installed in an L-configuration as shown in FIG. 1, is capable of transmitting a force of 50 pounds with each of its two push-pull blades 12, 13. The dimensions given are only illustrative and demonstrate that pursuant to this invention a flexible remote control with two force-transmitting members is very effective even though all of its elements are enclosed in a flexible tubular sheath of small diameter.

While FIG. 1 shows the remote control in association with chain 16 and sprocket 17 at only one end of the two push-pull blades 12, 13, it is often preferred to have another chain 16 and sprocket 17 associated with the opposite ends of blades 12, 13 in lieu of connectors 14. In such case, the remote control will have both blades 12, 13 and the two chains 16 connected to their opposite ends from a completely closed loop. Turn-buckles 15 can then be adjusted to tighten the closed loop and thus eliminate any slack or back-lash in either of blades 12, 13. Manually or otherwise turning one sprocket 17 partially will directly effect the same partial turning of the other sprocket 17. For example, a quarter clockwise turn of one sprocket 17 will impart an instantaneous quarter clockwise turn of the other sprocket. Furthermore, in this closed loop, each of blades 12, 13 is used to exert its force-transmitting capacity on a single mechanism only in tension. Since a push-pull blade is more susceptible to jamming within the tubular remote control when subjected to a high pushing force than when subjected to an equally high pulling force, it is clearly advantageous to use a remote control with two push-pull blades connected with a chain or the like to operate a single mechanism because then the mechanism can be more reliably controlled by applying only a pulling force on one blade or the other. In such case, the blades are never subjected to a pushing force.

However, if the remote control of FIG 1 is required to effect independent movement of two separate mechanisms connected, respectively, to connector 14 of blade 12 and to connector 14 of blade 13, then chain 16, sprocket 17 and the other elements beyond the opposite end of the remote control are eliminated and the free ends of blades 12, 13 are separately pushed or pulled to effect the desired movement of the mechanism connected to the opposite end of each of blades 12, 13.

Those skilled in the art will visualize many other modifications and variations of the invention set forth hereinbefore without departing from its spirit and scope. For instance, where the remote control is used for transmitting relatively light forces, the anchoring device for ball races 27 provided by slotted tubes 24, 25 may be replaced by the anchoring device disclosed in U.S. Pat. 3,128,637 to Richoux or the anchoring device may in some cases even be omitted. Likewise, chain 16 and sprocket 17 may be replaced by any known equivalent mechanism for converting translational movement into rotary movement, such as a belt around a pulley or a cable around a drum. Accordingly, the claims should not be interpreted in any restrictive sense other than that imposed by the limitations recited within the claims.

What is claimed is:

1. A flexible remote control device for transmitting push and pull forces, comprising a flexible tubular sheath, a pair of flexible guide members extending through said sheath in contact with diametrically opposite portions of the inner surface of said sheath, at least two flexible substantially flat force-transmitting blades individually adapted to move to and fro between said guide members to transmit push and pull forces and disposed apart from each other over their entire lengths and with their wide faces in substantially parallel alignment over the entire length of said sheath, and a row of rolling elements interposed between each of said guide members and one of said blades and between each pair of juxtaposed wide faces of said blades, said rolling elements enabling each of said blades to move to and fro freely.

2. The flexible remote control device of claim 1 wherein there are only two force-transmitting blades, the ends of said two blades at each end of said control device are respectively connected to the ends of a chain, said chain at each end of said control device passes around and engages a sprocket, and means for tightening the closed loop formed by said two blades and two chains passing around and engaging the two sprockets.

3. The flexible remote control device of claim 1 wherein there are three force-transmitting blades, the middle blade being wider than the other two blades.

4. The flexible remote control device of claim 3 wherein the ends of the two outer blades at each end of said control device are respectively connected to the ends of a chain, and said chain at each end of said control device tautly passes around and engages a sprocket.

5. The flexible remote control device of claim 1 wherein each row of rolling elements is a row of balls maintained spaced from one another by a flexible ball-cage strip.

6. A flexible remote control device for transmitting push and pull forces, comprising a flexible tubular sheath, a pair of flexible guide members extending through said sheath in contact with diametrically opposite portions of the inner surface of said sheath, at least two flexible substantially flat force-transmitting blades individually adapted to move to and fro between said guide members to transmit push and pull forces and disposed apart from each other over their entire lengths and with their wide faces in substantially parallel alignment over the entire length of said sheath, a row of rolling elements interposed between each of said guide members and one of said blades and between each pair of juxtaposed wide faces of said blades, said rolling elements enabling each of said blades to move to and fro freely, an end fitting fastened to each end of said sheath, and a slotted plug fastened to the opposite end of each end fitting, the slots in each plug substantially corresponding in crosssection to said blades passing slidably therethrough.

7. The flexible remote control device of claim 6 wherein each row of rolling elements is a row of balls maintained spaced from one another by a flexible ball-cage strip, said strip when between force-transmitting blades being of sufficient length to extend from one plug to the other plug and said strip when adjacent a guide member being shorter than said sufficient length by one-half of the distance traveled by each of said blades between the fully pushed and the fully pulled positions of said blades.

8. The flexible remote control device of claim 6 wherein the opposite ends of each guide member are held against the inner surfaces of the end fittings by the slotted plugs fastened to said end fittings.

9. The flexible remote control device of claim 7 wherein there are only two force-transmitting blades, and the ends of said two blades at least at one end of said control device are connected to a mechanism for converting translational movement into rotary movement near such end of said control device.

References Cited

UNITED STATES PATENTS

| | | | |
|---|---|---|---|
| 2,737,822 | 3/1956 | Morse | 74—501 |
| 2,845,813 | 8/1958 | Richoux | 74—501 |
| 3,287,990 | 11/1966 | Ellinger | 74—501 |

U.S. Cl. X.R.

WESLEY S. RATLIFF, Jr., Primary Examiner